(12) United States Patent
Tanrikulu et al.

(10) Patent No.: US 7,688,915 B2
(45) Date of Patent: Mar. 30, 2010

(54) METHOD AND SYSTEM FOR BLINDLY DETECTING A DISCONTINUOUSLY TRANSMITTED SHARED CHANNEL, IN PARTICULAR BLIND HIGH SPEED SHARED CONTROL CHANNELS DETECTION

(75) Inventors: Stéphane Erkan Tanrikulu, Annemasse (FR); Ettore Messina, Crozet (FR); Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 1138 days.

(21) Appl. No.: 11/144,366

(22) Filed: Jun. 3, 2005

(65) Prior Publication Data

US 2005/0286654 A1 Dec. 29, 2005

(30) Foreign Application Priority Data

Jun. 3, 2004 (EP) ................................ 04291379

(51) Int. Cl.
*H03K 9/00* (2006.01)
*H04L 27/00* (2006.01)
(52) U.S. Cl. ..................... 375/316; 375/346; 714/774
(58) Field of Classification Search ................ 375/316, 375/346; 714/751, 774, 776, 794, 795
See application file for complete search history.

(56) References Cited

U.S. PATENT DOCUMENTS 7,162,675 B2 * 1/2007 Das et al. ................... 714/751
2001/0040916 A1 11/2001 Sato ........................... 375/150
2003/0192003 A1 10/2003 Das et al. .................... 714/758
2004/0001428 A1 1/2004 Datta et al. .................. 370/208
2007/0136634 A1 * 6/2007 Hiraki et al. ................. 714/748

FOREIGN PATENT DOCUMENTS

WO 99/41847 8/1999

OTHER PUBLICATIONS

Low Complexity Stopping Criteria for UMTS Turbo-Decoders, Apr. 22-25, 2003, IEEE, pp. 2376-2380.*
Lucent Technologies, "Performance of the HS-SCCH" Apr. 9-12, publication No. XP-002301041; pp. 1-12.
Berens et al., "Channel Decoder Architecture for 3G Mobile Wireless Terminals", vol. 3 dated Feb. 16, 2004, pp. 192-197, XP 010684319.

* cited by examiner

*Primary Examiner*—Chieh M. Fan
*Assistant Examiner*—Freshteh N Aghdam
(74) *Attorney, Agent, or Firm*—Lisa K. Jorgenson; Allen, Dyer, Doppelt, Milbrath & Gilchrist, P.A.

(57) ABSTRACT

A method for detecting an eventual channel intended to a designated user equipment among n channels received by the designated user equipment during a given duration, each channel received during the duration carrying encoded data masked with an identifier associated to a user equipment. The method includes a selecting phase having a demasking step demasking the received masked encoded data of each channel with the identifier of the designated user equipment, a decoding step decoding the demasked encoded data of each channel to obtain a set of digital decoded data for each channel, a calculating step calculating, from each set of digital decoded data, a global information representative of a confidence in digital data received on the physical channel, and a detecting step detecting the channel from all the global information.

23 Claims, 4 Drawing Sheets

METHOD AND SYSTEM FOR BLINDLY DETECTING A DISCONTINUOUSLY TRANSMITTED SHARED CHANNEL, IN PARTICULAR BLIND HIGH SPEED SHARED CONTROL CHANNELS DETECTION

FIELD OF THE INVENTION

The present invention relates in general to channel decoding techniques, especially convolutionally encoded channels, and more particular to blind channel detection in a multi-user environment.

BACKGROUND OF THE INVENTION

An application of the invention is directed in general to the field of wireless communication systems. One of possible applications is the third generation mobile communications standard 3 GPP, and particularly in the release 5 and beyond wherein a high data rate service called High Speed Downlink Packet Access or HSDPA is defined.

A HSPDA service is made possible by use of a new shared channel called High Speed Downlink Shared Channel or HS-DSCH, mapped to several physical channels in the physical layer. A set of physical shared channels, presently up to 4, namely High Speed Shared Control Channels or HS-SCCH, is used to transmit all necessary control information for correct decoding and demodulating of HS-DSCH.

Only one HS-SCCH can be allocated to a user during a determined duration. However since several users might share the same HS-SCCH set and physical channels therein, the same HS-SCCH can be allocated to another user after the determined duration. The HS-SCCH is thus a discontinuously transmitted shared channel. The user equipment doesn't know which control channel is meant for it.

SUMMARY OF THE INVENTION

The invention provides an efficient blind detection of an eventual channel among a set of received channels, in particular for HS-SCCH channels.

Thus, the invention provides a method for blindly detecting an eventual channel (discontinuously transmitted shared channel) intended to a designated user equipment among n channels, for example high speed time shared control channels, received by the designated user equipment, such as a mobile phone, during a given duration, each channel received during the duration carrying encoded data masked with a specific identifier associated to a user equipment. The method includes a selecting phase including demasking the received masked encoded data of each channel with the identifier of the designated user equipment; decoding the demasked encoded data of each channel to obtain a set of digital decoded data for each channel; calculating, from each set of digital decoded data, a global confidence information representative of a confidence in digital data received on the corresponding channel; and detecting the eventual channel from the n global confidence information.

According to a first embodiment, the detecting step comprises detecting the maximum global confidence information among the n global confidence information, the eventual channel being the one having the maximum global confidence information. However, in very bad channel conditions, there is a high probability of taking a wrong channel. Accordingly a threshold is preferably introduced to decide if the maximum value is reliable or not. In other words, the detecting step may comprise detecting the maximum global confidence among the n global confidence information, and validating the maximum global confidence information by using a threshold.

In a preferred embodiment, the detecting step comprises: calculating the value (Max1−Max2)/Max1, wherein Max1 is the greatest global confidence information and Max2 the second greatest global confidence information; comparing the value (Max1−Max2)/Max1 with the threshold; and choosing the eventual channel having the global confidence information equal to Max1 if the value (Max1−Max2)/Max1 is greater or equal to the threshold. The value (Max1−Max2)/Max1 can theoretically vary from 0 to 1. The channel that gives the maximum reliability can be selected by putting the threshold to 0.

The detecting step further comprises advantageously a test step testing if the detecting step is reliable or not. If the detecting step is not reliable, the method comprises advantageously a validating phase for validating or not validating the eventual channel detected in the detecting step. For example, the validating phase comprises re-encoding and re-masking the decoded data of the eventual detected channel, and comparing the re-encoded and re-masked data with the masked encoded data received from the eventual detected channel. In this comparing step, data mutually compared are, for example, soft bits.

In a preferred embodiment, the comparing step uses a second threshold. The validating phase cannot only be applied to the best channel but to the $n_1$ most promising channels, with $n_2$ inferior or equal to n, for example equal to two. Thus the probability of missing an intended channel is reduced. This operation is especially of interest if more than four channels have to be detected.

The decoding step preferably uses an algorithm of Maximum A Posteriori (MAP) type delivering for each channel a set of log likelihood ratio corresponding to the digital decoded data, and, for each channel, the global confidence information is the sum of the absolute values of the corresponding log likelihood ratio. By using a MAP decoder for decoding the encoded data, in particular the convolutionally encoded data, the probability of detection is improved and the probability of false alarm is minimized compared to other existing detection algorithms, like Viterbi algorithm which is a specific implementation of MLSE (maximum likelihood sequence estimation) algorithms.

However, implementing the decoding step, with for example Viterbi algorithm or MLSE algorithm is possible. A Viterbi algorithm traverses a trellis stage by stage. All the states of all the stages are associated with cumulated state metrics. For searching the most likely sequence of symbols that has been sent, the Viterbi algorithm traverses the trellis from the all-zero state to the end state and looks for most likely sequence. The states chosen for the survivor path (path having the minimum cumulated state metric) indicate the most likely sequence of symbols that has been sent. For the blind detection according to the invention, the maximum-cumulated state metric (global confidence information) given by each channel is used as reliability of the decoded result. More precisely the channel given the maximum metric is selected.

When a MLSE algorithm is used, a correlation energy (global confidence information) is calculated for each channel from the decoded data and the channel given the maximum correlation energy is selected. For example, the n channels are high speed time shared control channels.

The invention proposes also a system for blindly detecting an eventual channel intended to a designated user equipment among n channels received by the designated user equipment during a given duration. Each channel received during the duration carries encoded data masked with an identifier associated to a user equipment. The system comprises a selecting means or selector comprising: a demasking means or demasker for demasking the received masked encoded data of each channel with the identifier of the designated user equipment; a decoding means or decoder for decoding the demasked encoded data of each channel to obtain a set of digital decoded data for each channel; a first calculating means or calculator for calculating, from each set of digital decoded data, a global confidence information representative of a confidence in digital data received on the corresponding channel; and a detecting means or detector for detecting the eventual channel from the n global confidence information.

According to a first embodiment, the detector/detecting means are adapted for detecting the maximum global confidence information among the n global confidence information, the eventual channel being the one having the maximum global confidence information. In a second embodiment, the detector/detecting means are adapted for detecting the maximum global confidence among the n global confidence information, and for validating the maximum global confidence information by using a threshold.

According to a preferred embodiment, the detector/detecting means comprise second calculating means or calculator for calculating the value (Max1−Max2)/Max1, wherein Max1 is the greatest global confidence information and Max2 the second greatest global confidence information; a comparing means or comparator for comparing the value (Max1−Max2)/Max1 with the threshold; and choosing means or chooser for choosing the eventual channel having the global confidence information equal to Max1, if the value (Max1−Max2)/Max1 is greater or equal to the threshold.

The detector/detecting means further preferably comprise testing means or tester for testing if the detecting step is reliable or not. For example, the decoder/decoding means are adapted for using an algorithm of Maximum A Posteriori (MAP) type delivering for each channel a set of log likelihood ratio corresponding to the digital decoded data, and in that the first calculator/calculating means are adapted for calculating, for each channel, the global confidence information as the sum of the absolute values of the corresponding log likelihood ratio.

Furthermore, the system comprises validating means or validator for validating or not validating the eventual channel detected by the detector/detecting means. According to an embodiment, the validating means comprise re-encoding means or re-encoder and re-masking means or re-masker for re-encoding and re-masking the decoded data of the eventual detected channel, and comparison means or comparator for comparing the re-encoded and re-masked data with masked encoded data transmitted by the eventual detected channel.

Comparison means are adapted for comparing soft bits. In a preferred embodiment, the comparison means are adapted for using a second threshold. Furthermore, the validating means are adapted for processing the $n_1$ best channels detected, with $n_1$ inferior or equal to n. According to an embodiment, the n channels are high speed time shared control channels. For example, the system is part of an element of a wireless system of communication, such as a cellular mobile phone.

BRIEF DESCRIPTION OF THE DRAWINGS

Other advantages and features of the invention will appear on examining the detailed description of embodiments, and of the appended drawings in which.

DETAILED DESCRIPTION OF THE PREFERRED EMBODIMENTS

Figure 1:
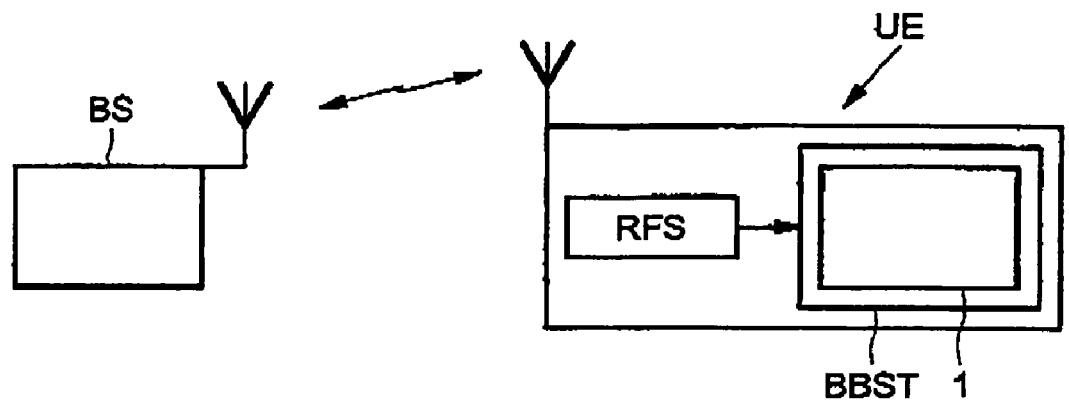
FIG. 1 is a schematic block diagram illustrating a cellular mobile phone with a system according to an aspect of the invention.

Referring now to FIG. 1 which illustrates a system 1 according to an aspect of the invention, which is incorporated in the reception chain of a cellular mobile phone UE, although the invention is not limited to this particular application. A base station BS emits signal to mobile phones. A mobile phone UE receives the signal, which is processed by a radio-frequency stage RFS, and a digital base band stage BBST. The base band stage BBST comprises a system 1 according to the invention which blindly detects an eventual channel intended to the mobile phone UE, which is the designated user equipment, among n channels received by the mobile phone UE during a given duration.

Each channel received during this duration carries encoded data masked with an identifier associated to a mobile phone (the designated mobile phone UE or another mobile phone). So it is necessary to process data received, to eventually detect and use the data intended to the mobile phone UE and not to another.

The following description is directed to a particular application of the invention related to a high data rate service called High Speed Downlink Packet Access or HSDPA and defined in the third generation mobile communications standard 3 GPP, particularly in the release 5. A HSPDA service is made possible by use of a new shared channel called High Speed Downlink Shared Channel or HS-DSCH. It is mapped in the layer 1 (physical layer) presently to up to 15 physical channels. Those channels are time shared by the different users.

Before a high speed connection could be established, the mobile phone UE has to know which physical channels it has to decode for getting data. The mobile phone UE needs the following information to set a high speed connection: the number of physical channels, the coding rate, the modulation scheme, the constellation version, and the automatic repeat request control information.

The base station BS transmits the above mentioned information over an additional shared channel called High Speed Shared Control Channel HS-SCCH. As its name indicates, this channel HS-SCCH carries control information for all users in cell. Four physical channels HS-SCCH1, HS-SCCH2, HS-SCCH3, HS-SCCH4, represent this channel. These four channels are time shared by all mobile phones.

The identification of different users is made possible by masking bits calculated based on the mobile phone identity number as described in 3 GPP TS 25.212. The mobile phone UE has to continuously monitor the four HS-SCCH and detect if there is a channel allocated for it. If this is the case, it has to detect which one is the right one.

Figure 2:
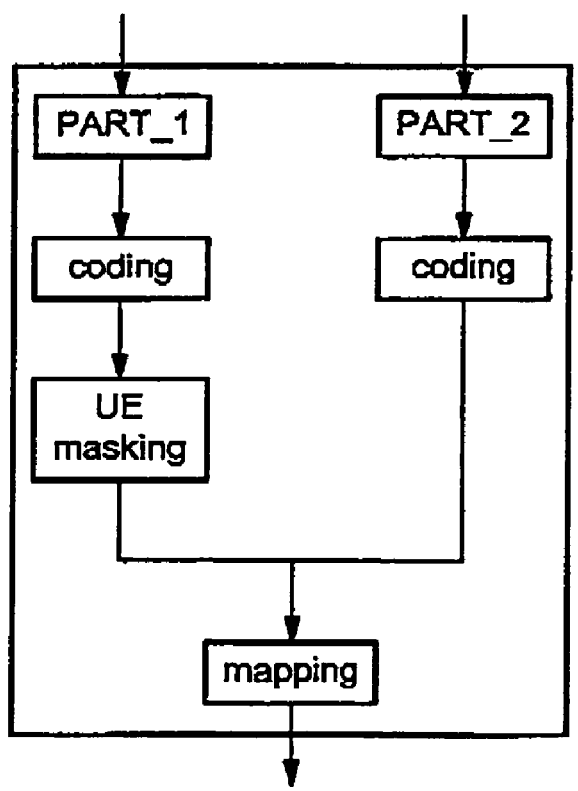
FIG. 2 is a schematic block diagram illustrating a processing of data made in a base station.

As illustrated on FIG. 2, the control information to be transmitted is split into two parts: a first part PART_1 and a second part PART_2. These two parts PART_1, PART_2 are convolutionally encoded separately and then mapped to the physical channel. The first part PART_1 is mapped to the first slot of HS-SCCH sub-frame and the second part PART_2 to the remaining two slots. The first part information PART_1 is constituted of parameters indicating to the mobile phone UE which Channelization Codes Set and which Modulation Scheme is used for transmitting data on the corresponding HS-DSCH. In other words, the first part information PART_1 tells the mobile phone UE where and how to look for getting the right data flow from HS-DSCH, and the second part information PART_2 indicates how to decode the received HS-DSCH sub-frame.

After the coding operation and a puncturing operation, the encoded first part information PART_1 (40 bits) are scrambled with a mask associated to the mobile phone UE (UE masking). For example a masking operation used can be a bit to bit addition modulo 2 between a predetermined series of bits (mask) and data to be masked. Concerning the first part PART_1 processing, the coding module receives a sequence of N bits (N=8 here) and delivers an encoded sequence of M bits. (M=48 here). After puncturing, a sequence of 40 bits is masked. The mapping module outputs a mapped sequence of P symbols to the air, where P equals to M/2.

For each HS-DSCH TTI (Transmit Time Interval), each shared control channel HS-SCCH1, HS-SCCH2, HS-SCCH3, HS-SCCH4, carries HS-DSCH-related downlink signalling for one mobile phone. The number of HS-SCCHs can range from a minimum of one HS-SCCH (n=1) to a maximum of four HS-SCCHs (n=4). Each HS-SCCH carries information for one mobile phone.

Figure 3:
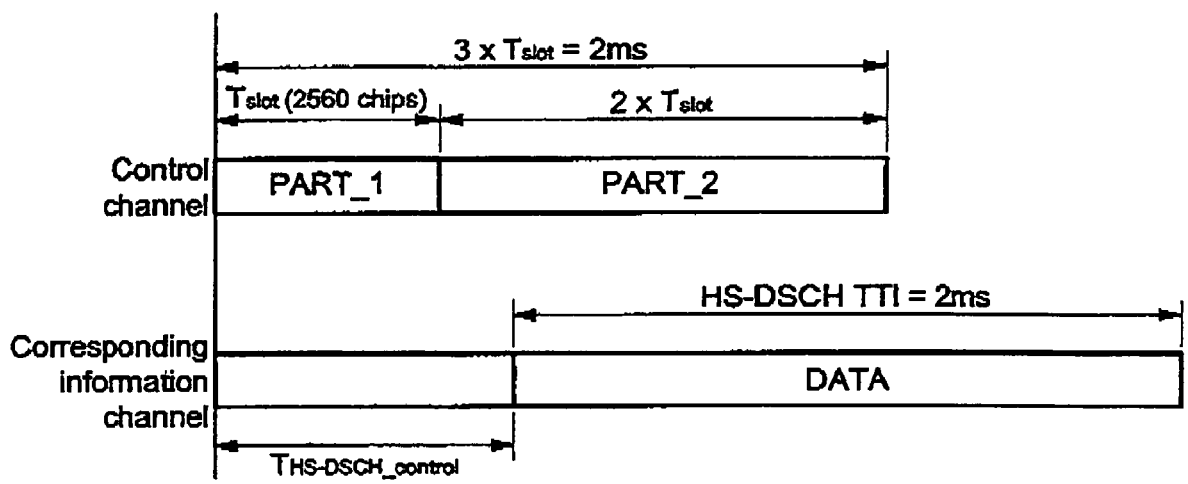
FIG. 3 is a schematic diagram illustrating time relationship between HS-DSCH TTI (Transmit Time Interval) and HS-SCCH in a HSPDA service.

FIG. 3 shows the time relationship between HS-DSCH TTI and HS-SCCH. Considering the four control channels HS-SCCH1, HS-SCCH2, HS-SCCH3, HS-SCCH4, to be monitored simultaneously, the above-mentioned characteristics show how it is important to implement an efficient detection algorithm. For power consumption and mobile phone buffer capabilities purposes it becomes obvious that HS-SCCH detection should be done very early (before acquiring HS-DSCH sub-frame). The mobile phone UE has exactly 2560 chips to decode the encoded first part information PART_1 of the four control channels HS-SCCH1, HS-SCCH2, HS-SCCH3, HS-SCCH4, and detect if there is one meant for it. The receiver monitors all four control channels HS-SCCH1, HS-SCCH2, HS-SCCH3, HS-SCCH4, which are distinguished by different spreading codes. Each channel is decoded and the detection algorithm according to the invention is used to find the intended channel. The detection of the channel has to be done before decoding the second part information PART_2.

On the receiving side (mobile phone UE), the mapped sequence of each channel is demodulated to obtain a corresponding sequence of 40 digital data or "soft bits". A soft bit corresponds to a binary information encoded on several hard bits or bits depending on the required precision. The value of each soft bit varies theoretically from $-\infty$ to $+\infty$.

Figure 4:
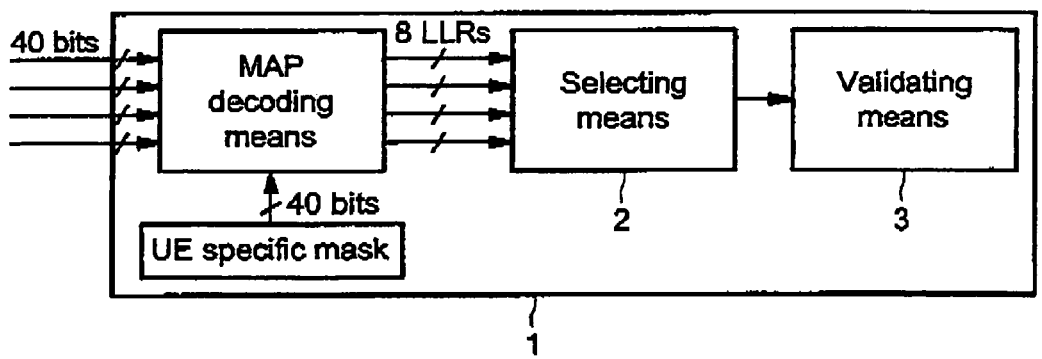
FIG. 4 is a schematic diagram illustrating an embodiment of a system according to the invention.

Referring to FIG. 4, an embodiment of the system 1 according to the invention will described. The system 1 comprises MAP decoder or decoding means which are adapted to decode data received on the four control channels. The specific mask of the mobile phone UE (user equipment) is for example stored in a memory. The system 1 also comprise selector or selecting means 2 for selecting an eventual channel from the four control channels, and optionally a validater or validating means 3 for validating or not the eventual channel detected by the selecting means.

The proposed decoder is a Max-Log-MAP (but the algorithm is not limited to the use of only MAP decoder, but also Viterbi and MLSE like decoders). This is a sub-optimal Log-MAP decoder. The performance of this decoder is better than the Viterbi one. The input soft bits to the decoder are used to calculate the different metrics that allows the decoder to find a certain soft estimation of the soft bits actually sent.

A MAP decoder for decoding convolutionally encoded data is well known by those skilled in the art. An example of such a decoder is for example described in the European patent application No. 1398881. Reference can be also made to EP 03290993.9.

For each considered control channel HS-SCCH1, HS-SCCH2, HS-SCCH3, HS-SCCH4, the decoder will output eight log likelihood ratios (LLRs). The sign of each LLR is used by the MAP decoder to decide whether the transmitted bit was a 1 (negative value) or a 0 (positive value). That is corresponding to the UMTS bit mapping. Additional information can be extracted by each LLR, for example the reliability of the decision represented by the absolute amplitude of the LLR.

Figure 5:
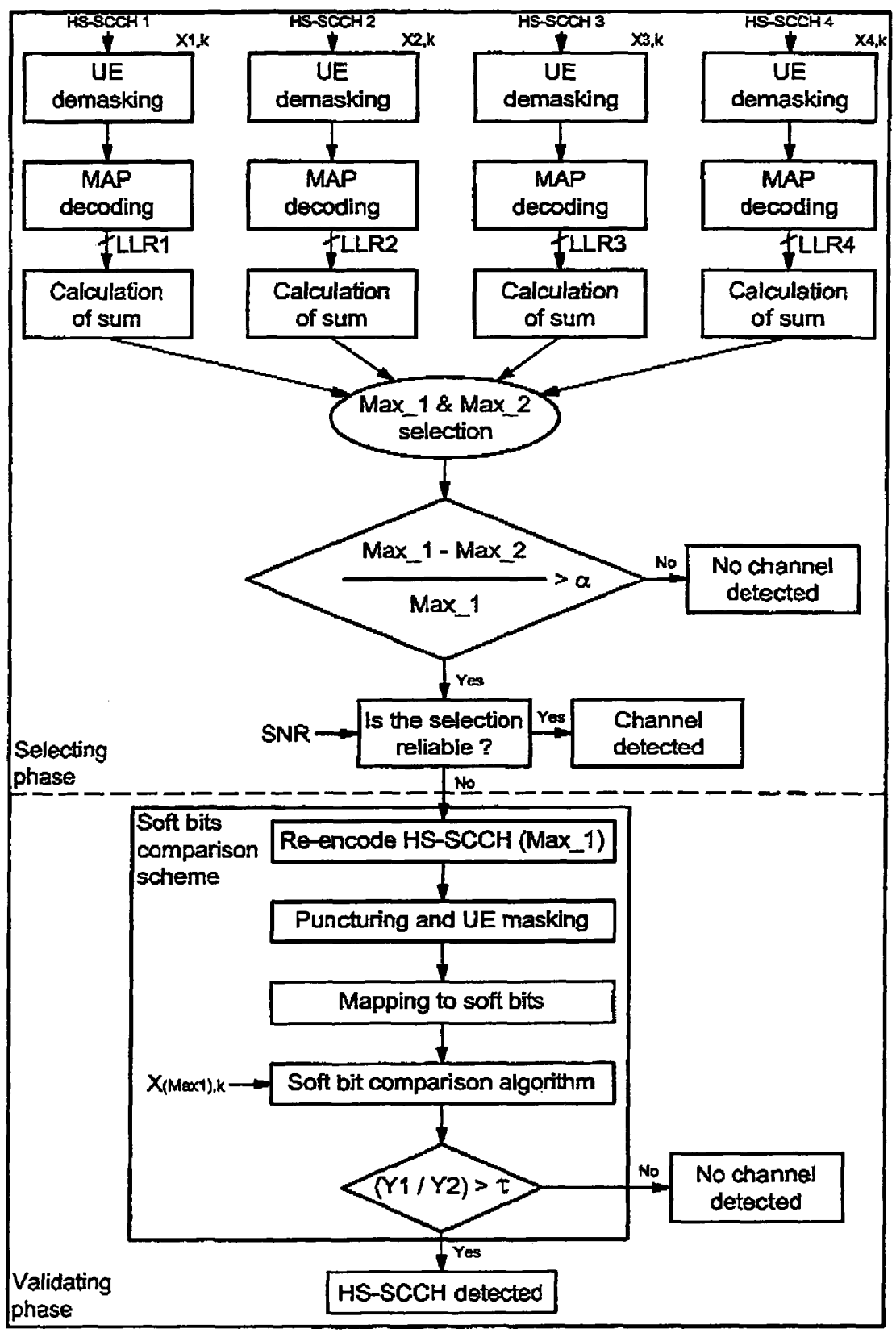
FIG. 5 is a flowchart illustrating an embodiment of the method according to the invention.

The selecting means 2 and the validating means 3 are for example realized by software within a processor. These means as well as the means incorporated therein will be described functionally therebelow by reference to FIG. 5 in particular. Referring to the FIG. 5, a "two phases" detecting process is described to get efficient information about the presence of a HS-SCCH. The method comprises thus preferably a selecting phase and a validating phase although the validating phase is optional.

The four control channels HS-SCCH1, HS-SCCH2, HS-SCCH3, HS-SCCH4, respectively deliver the first part PART_1 formed by 40 soft bits X1,k, X2,k, X3,k, X4,k, (k varying from 1 to 40). A UE demasking is done with the UE specific mask. Then, for each control channel, HS-SCCH1, HS-SCCH2, HS-SCCH3, HS-SCCH4, a MAP decoding is done, and delivers a set of log likelihood ratio LLR1i, LLR2i, LLR3i, LLR4i, i varying from 1 to 8, corresponding to the digital decoded data. Then, for each control channel, a global confidence information is calculated, for example the sum of the absolute values of the LLRs.

The detection of the eventual control channel could be directly done with the greatest global confidence information, i.e. the greatest sum of absolute values of LLRs corresponding to a control channel. However, in the case when no HS-SCCH was actually intended for the user of interest, this would lead to a false detection.

So, the detection of the eventual control channel is preferably made in several steps. First, a selection of the two calculated greatest sums of LLRs, Max_1 and Max_2 is done. Then the value (Max1−Max2)/Max1 is calculated and compared with a threshold $\alpha$. If (Max1−Max2)/Max1 is not greater than $\alpha$, no channel is detected, else an eventual control channel is detected. In this example, Max_1 corresponds to HS-SCCH1, and Max_2 to HS-SCCH2.

Figure 6:
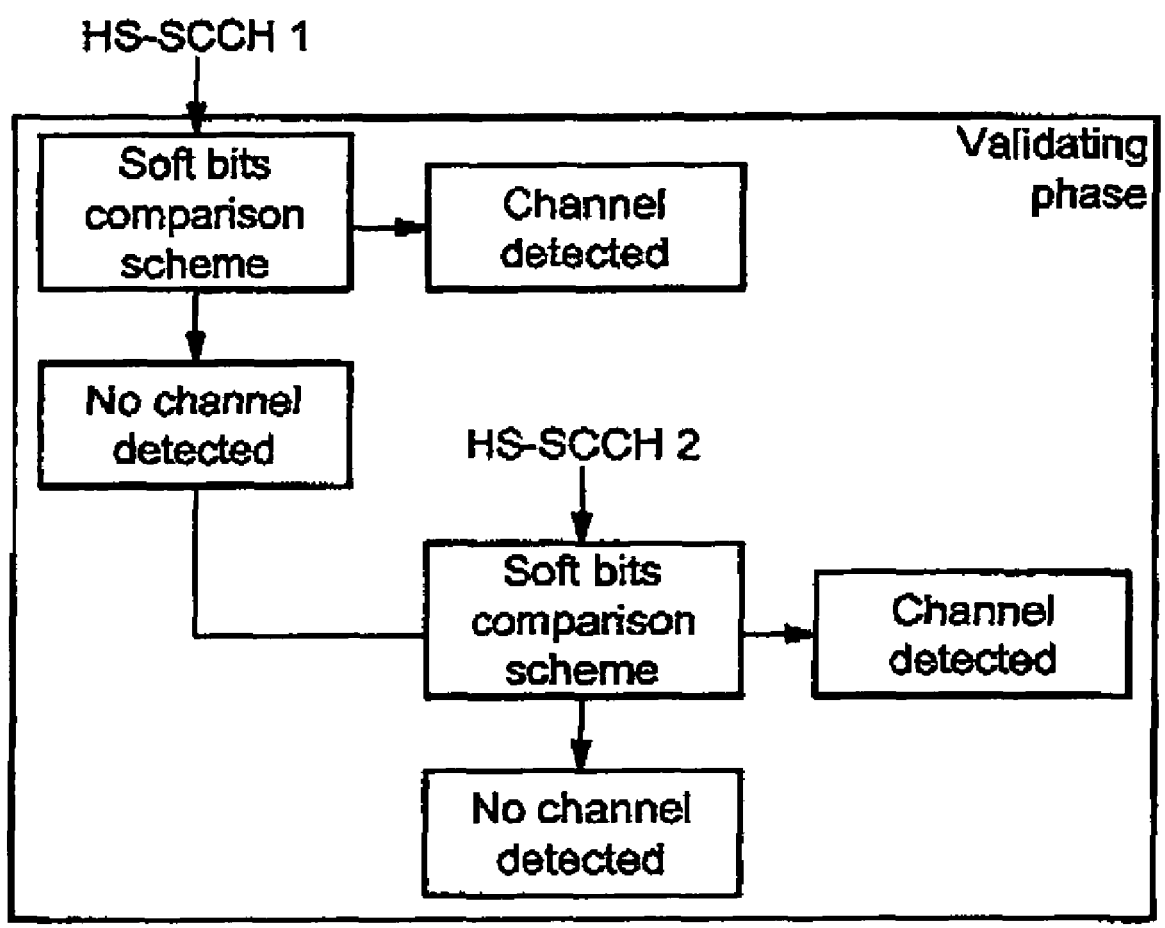
FIG. 6 is a flowchart illustrating another embodiment of the optional validating phase of FIG. 5.

As represented in FIG. 6, a reliability of the selection is advantageously made. More precisely, the signal to noise ratio SNR can be used to determine the reliability of the selection of the eventual control channel. For example, if the SNR is greater than a predetermined value, the selection can be considered as reliable. Otherwise, the validating phase is performed. This validating phase is based on a soft bit comparison scheme. The encoding scheme (see 3 GPP TS 25.212) used in the generation of the UE masking bits has a minimum hamming distance of eight bits. The invention takes advantage of this property and defines a new criterion via soft metrics calculated based on soft bits. The soft bits comparison scheme includes checking whether the UE mask applied by the mobile is the right one or not. Soft values of the received symbols are used to calculate two soft metrics as follows. Once the mobile phone UE has selected one channel (for example HS-SCCH1), the decoded bits from this latter are convolutionally re-encoded, thus obtaining 48 soft bits. These 48 Soft bits are punctured and scrambled with the UE mask. Then these 40 binary bits {0, 1} are mapped to soft values {1.0, −1.0}. These mapped soft bits are then compared with the received soft bits X1, k of the detected channel HS-SCCH1.

An example of such an algorithm will be now described more in details. Let's Xk be received soft bits of HS-SCCH1 and Bk the re-encoded binary bits. As mentioned above the sum Y1 of the absolutes values of Xk is firstly calculated:

$$Y1 = \sum_{i=1}^{40} |X_{1,i}|.$$

Then the sum Y2 is calculated as follows:

$$Y2 = \sum_{i=1}^{40} X_{1,i} \times \mathrm{map}(Bi)$$

where map(Bi) is the soft bit of rank i after the mapping to soft bits. Finally, given a threshold τ, the condition tested is:

$$\frac{Y2}{Y1} \geq \tau$$

the detection process is validated if the inequality is satisfied.

In very good channels conditions and given the channel being received is the correct one, the sum Y2 is equal to the sum Y1. Reciprocally, in very bad channel conditions the sum Y2 can be equal to the opposite of the sum Y1, i.e. equal to −Y1.

Thus $$-1 \leq \frac{Y2}{Y1} \leq 1.$$

The performance of the detection method strongly depends on the value chosen for τ. The value of the threshold τ is taken to get a good compromise between detection probability, and false alarm probability. This threshold τ can be assigned to a value around 0, 8. This threshold τ can be modified depending on the channel conditions. In very good conditions the threshold is increased to reduce false alarm probability.

An optimization of the described method is possible. More precisely, the validating phase can be applied to the $n_1$ best channels detected, for example the two best channels detected, as illustrated on the FIG. 6. The beginning of the algorithm is the same than illustrated by the FIG. 5, but in case wherein no channel is detected after processing data of the control channel HS-SCCH1, the same processing is applied to the second best control channel HS-SCCH2. Thus the probability of missing an intended channel is reduced. This operation is especially of interest, if more than 4 channels have to be detected.

That which is claimed is:

1. A method for blindly detecting an eventual channel intended for a designated user equipment among n channels received by the designated user equipment during a given duration, each channel received during the duration carrying encoded data masked with an identifier associated to a user equipment, comprising a selecting phase comprising:
   demasking the received masked encoded data of each channel with the identifier of said designated user equipment;
   decoding the demasked encoded data of each channel to obtain a set of digital decoded data for each channel;
   calculating, from each set of digital decoded data, a global confidence information representative of a confidence in digital data received on the corresponding channel; and
   detecting said eventual channel from said n global confidence information;
   wherein detecting comprises detecting a maximum global confidence among said n global confidence information, and validating said maximum global confidence information based upon a threshold, including
      calculating (Max1-Max2)/Max1, wherein Max1 is a greatest global confidence information and Max2 is a second greatest global confidence information,
      comparing the value (Max1-Max2)/Max1 with said threshold, and
      choosing the eventual channel having the global confidence information equal to Max1 if said value (Max1-Max2)/Max1 is greater than or equal to said threshold.

2. A method according to claim 1, wherein detecting comprises detecting a maximum global confidence information among said n global confidence information, said eventual channel being the one having said maximum global confidence information.

3. A method according to claim 1, wherein detecting further comprises determining a reliability of the detecting.

4. A method according to claim 1, wherein decoding uses a Maximum A Posteriori (MAP) type process to deliver, for each channel, a set of log likelihood ratios corresponding to the digital decoded data; and wherein, for each channel, said global confidence information is the sum of absolute values of the corresponding log likelihood ratios.

5. A method according to claim 1, further comprising a validating phase for validating or invalidating the detected eventual channel.

6. A method according to claim 5, wherein the validating phase comprises re-encoding and re-masking the decoded data of said detected eventual channel, and comparing said re-encoded and re-masked decoded data with masked encoded data received from said detected eventual channel.

7. A method according to claim 6, wherein comparing comprises mutually comparing soft bits.

8. A method according to claim 6, wherein comparing comprises comparing the data with a second threshold.

9. A method according to claim 5, wherein the validating phase is applied to the $n_1$ best channels detected, $n_1$ being less than or equal to n.

10. A method according to claim 1, wherein the n channels comprise high speed shared control channels (HS-SCCH).

11. A system for blindly detecting an eventual channel intended for a designated user equipment among n channels received by the designated user equipment during a given duration, each channel received during the duration carrying encoded data masked with an identifier associated to a user equipment, the system comprising:

a demasker for demasking the received masked encoded data of each channel with the identifier of said designated user equipment;

a decoder for decoding the demasked encoded data of each channel to obtain a set of digital decoded data for each channel;

a first calculator for calculating, from each set of digital decoded data, a global confidence information representative of a confidence in digital data received on the corresponding channel; and a detector for detecting said eventual channel from said n global confidence information;

wherein the detector detects a maximum global confidence among said n global confidence information, and validates said maximum global confidence information based upon a threshold, the detector including a second calculator for calculating the value (Max1-Max2)/Max1, wherein Max1 is a greatest global confidence information and Max2 is a second greatest global confidence information, a comparator for comparing the value (Max1-Max2)/Max1 with the threshold, and a selector for choosing the eventual channel having the global confidence information equal to Max1, if the value (Max1-Max2)/Max1 is greater than or equal to the threshold.

12. A system according to claim 11, wherein the detector detects a maximum global confidence information among said n global confidence information, said eventual channel being the one having the maximum global confidence information.

13. A system according to claim 11, wherein the detector further comprises a tester for testing a reliability of the detecting.

14. A system according to claim 11, wherein the decoder uses a Maximum A Posteriori (MAP) type process to deliver, for each channel, a set of log likelihood ratio (LLRi) corresponding to the digital decoded data; and wherein the first calculator calculates, for each channel, said global confidence information as the sum of the absolute values of the corresponding log likelihood ratio (LLRi)

15. A system according to claim 11, further comprising a validator for validating or invalidating the eventual channel detected by the detecting means.

16. A system according to claim 15, wherein the validator comprises a re-encoder and re-masker for re-encoding and re-masking the decoded data of said detected eventual channel, and a comparator for comparing the re-encoded and re-masked decoded data with masked encoded data received from the detected eventual channel.

17. A system according to claim 16, wherein the comparator compares soft bits.

18. A system according to claim 16, wherein the comparator compares the data with a second threshold.

19. A system according to claim 16, wherein the validator processes the $n_1$ best channels detected, $n_1$ being less than or equal to n.

20. A system according to claim 11, wherein the n channels comprise high speed shared control channels (HS-SCCH).

21. A wireless communication device for use in a wireless communication system, the device comprising:

a unit for blindly detecting an eventual channel intended for the device among n channels received by the device during a given duration, each channel received during the duration carrying encoded data masked with a device identifier, the unit including a demasker for demasking the received masked encoded data of each channel with the identifier of the device, a decoder for decoding the demasked encoded data of each channel to obtain a set of digital decoded data for each channel, a first calculator for calculating, from each set of digital decoded data, a global confidence information representative of a confidence in digital data received on the corresponding channel, and a detector for detecting said eventual channel from said n global confidence information;

wherein the detector detects a maximum global confidence among said n global confidence information, and validates said maximum global confidence information based upon a threshold, the detector including a second calculator for calculating the value (Max1-Max2)/Max1, wherein Max1 is a greatest global confidence information and Max2 is a second greatest global confidence information, a comparator for comparing the value (Max1-Max2)/Max1 with the threshold, and a selector for choosing the eventual channel having the global confidence information equal to Max1, if the value (Max1-Max2)/Max1 is greater than or equal to the threshold.

22. A device according to claim 21, wherein the device comprises a cellular mobile phone.

23. A device according to claim 21, wherein the unit further comprises a validator to validate or invalidate the detected eventual channel.

* * * * *

UNITED STATES PATENT AND TRADEMARK OFFICE
CERTIFICATE OF CORRECTION

PATENT NO. : 7,688,915 B2  Page 1 of 1
APPLICATION NO. : 11/144366
DATED : March 30, 2010
INVENTOR(S) : Tanrikulu et al.

It is certified that error appears in the above-identified patent and that said Letters Patent is hereby corrected as shown below:

| | |
|---|---|
| Column 1, Line 17 | Insert: --the-- |
| Column 1, Line 22 | Delete: "HSPDA"<br>Insert: --HSDPA-- |
| Column 2, Line 29 | Delete: "$n_2$"<br>Insert: --$n_1$-- |
| Column 4, Line 41 | Delete: "HSPDA"<br>Insert: --HSDPA-- |
| Column 5, Line 18 | Delete: "modulo"<br>Insert: --module-- |
| Column 5, Line 63 | Delete: "comprise"<br>Insert: --comprises-- |
| Column 7, Line 13 | Delete: "details"<br>Insert: --detail-- |
| Column 7, Line 15 | Delete: "absolutes"<br>Insert: --absolute-- |
| Column 7, Line 39 | Delete: "channels"<br>Insert: --channel-- |
| Column 7, Line 61 | Delete: "than"<br>Insert: --as that-- |

Signed and Sealed this

Seventeenth Day of August, 2010

David J. Kappos
*Director of the United States Patent and Trademark Office*